United States Patent [19]

Eldh et al.

[11] Patent Number: 4,736,692

[45] Date of Patent: Apr. 12, 1988

[54] METHOD OF HANDLING FUEL

[75] Inventors: Bo Eldh, Atvidaberg; Eva-Lena Ivarsson, Linköping, both of Sweden

[73] Assignee: ASEA Stal Aktiebolag, Finspong, Sweden

[21] Appl. No.: 875,580

[22] Filed: Jun. 18, 1986

[30] Foreign Application Priority Data

Jun. 20, 1985 [SE] Sweden ............................. 8503093

[51] Int. Cl.⁴ ............................................. F23G 5/04
[52] U.S. Cl. ...................................... 110/224; 34/10; 34/57 E
[58] Field of Search ................... 34/10, 57 R, 57 E; 110/204, 224, 245, 263, 303, 345, 346; 122/4 D; 406/92, 99, 135; 222/630

[56] References Cited

U.S. PATENT DOCUMENTS

| 1,645,932 | 10/1927 | Salyards | 406/135 |
| 1,687,435 | 10/1928 | Fleetwood et al. | 406/135 |
| 3,529,558 | 9/1970 | Tanner | 110/224 |
| 3,552,333 | 1/1971 | Salamon | 110/224 |
| 3,766,661 | 10/1973 | Bayens et al. | 34/57 E |
| 3,884,620 | 5/1975 | Rammler | 34/57 R |
| 4,082,498 | 4/1978 | Offergeld et al. | 34/57 R |
| 4,414,905 | 11/1983 | Beranek et al. | 110/224 |
| 4,454,661 | 6/1984 | Klein et al. | 34/57 E |
| 4,505,209 | 3/1985 | Strohmeyer | 122/4 D |
| 4,505,230 | 3/1985 | Laplin | 110/204 |
| 4,593,630 | 6/1986 | Teigen | 122/4 D |
| 4,628,833 | 12/1986 | O'Hagan | 110/224 |

Primary Examiner—Larry I. Schwartz
Attorney, Agent, or Firm—Watson, Cole, Grindle & Watson

[57] ABSTRACT

A method for drying, crushing and distribution of solid fuel for a solid fuel boiler, for example a fluidized bed boiler. The method is characterized in that moist fuel is crushed and dried by intermixing gas and/or ash, and that the fuel is set in motion, for example in a cyclone together with gas, the fuel thus being divided into several sub-flows for feeding into the boiler at different points.

8 Claims, 1 Drawing Sheet

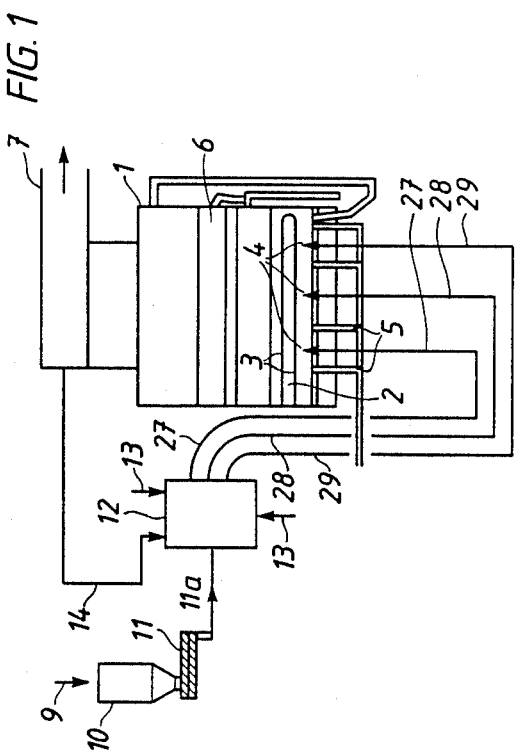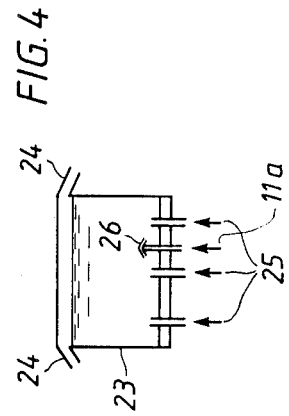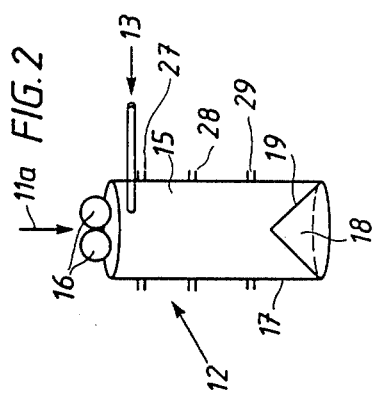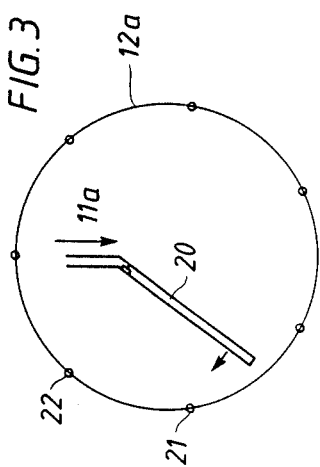

METHOD OF HANDLING FUEL

TECHNICAL FIELD

The present invention relates to a method for drying, crushing and distribution of solid fuel in particulate form for solid fuel boilers such as fluidized bed boilers.

Problems in connection with the handling of fuel for the above-mentioned purpose are that such fuel often has a large moisture content and frequently exists in coarse pieces or agglomerates. The problems may be particularly inconvenient when a flow of transported fuel has to be divided into several sub-flows.

SUMMARY OF THE INVENTION

The invention aims to provide a solution to the above-mentioned problems and other problems associated therewith. The method according to the invention is characterized in that moist fuel is crushed and at least partly dried by mixing it with a drying agent (e.g. gas and/or ash), is set into motion entrained in flowing gas, and is thereafter divided into a plurality of sub-flows to be fed separately into the boiler. In this way, the surface moisture of the fuel is taken care of by means of evaporation or, alternatively, binding of the surface moisture by the use of ash. After crushing of the fuel, a division of the crushed fuel into sub-flows is obtained, each sub-flow having a consistency suitable for, for example, fluidized bed boilers.

The fuel can be fed into a unit in which it is crushed and dehumidified and in which it is divided into the required number of sub-flows. To this unit, gas and/or finely divided ash is/are added, which evaporate(s) or, alternatively, bind(s) the surface moisture of the fuel. A crusher means may be arranged inside the unit or can be connected to the unit, this crusher breaking down the fuel into a particle size which is suitable for the combustion process. In the unit the fuel is set in motion in such a way that the total flow can be divided into the required number of sub-flows. The last-mentioned measure can be performed as follows:

(a) Part of the unit is constructed in the form of a cyclone, in which the sub-flows are taken out along the periphery of the cyclone, i.e., the fuel moves around in a helical path and leaves the cyclone through a number of different outlets. The exact number of outlets will be determined by the desired number of sub-flows. The gas needed for this movement can either by the hot drying gas mentioned above or cold gas which is supplied, e.g., to entrain the ash (in those cases where drying is performed by means of ash).

(b) The distribution can be carried out by forcing the fuel to different feeding-out points by means of a rotary arm, vane or the like at the bottom of the unit.

(c) The distribution can be carried out by forming part of the unit as a fluidized bed with outlet tubes serving as wiers or spillways. When the level of the fluidized bed is at the same level as the outlet tubes, the prepared fuel is distributed over the different tubes. The fluidizing air may either be the hot drying gas mentioned above or cold gas, as in the case of ash admixture.

BRIEF DESCRIPTION OF DRAWING

The invention will now be further described, by way of example, with reference to the accompanying drawing, in which:

FIG. 1 is a schematic side view of a boiler and its associated solid fuel handling equipment, FIG. 2 shows a cyclone with a crushing device forming part of the equipment shown in FIG. 1, FIG. 3 shows equipment for distributing crushed fuel using a rotating arm, and FIG. 4 shows a distributing unit for solid fuel based on a fluidized bed.

DESCRIPTION OF PREFERRED EMBODIMENTS

In FIG. 1, 1 represents a fluidized bed boiler in which, in a first bed 2 (the lowermost bed), there is arranged a nest of boiler tubes 3 for water and steam intended to be heated during fuel combustion in the boiler 1. Fuel enters at 4 and the bed is fluidized by means of air fed into the bed through tubes 5. The boiler 1 is also provided with a second bed 6 (and possibly further additional beds—not shown) and with a gas outlet 7. The other parts associated with the boiler 1 are not shown, since they are not necessary for an understanding of the invention.

Solid fuel, such as coal, is fed at 9 into a buffer silo 10, or the like storage vessel, and is fed (e.g. by means of a screw conveyor 11) at 11a into a crushing/drying unit 12. One form of unit 12 is shown schematically in FIG. 2. To this unit 12 there is supplied hot gas at 13 as well as fly ash fed via a duct 14 from the gas outlet 7. From the unit 12, three out-flowing sub-flows 27, 28, 29 of crushed, dried fuel lead to the coal inlets 4. There can, of course, be more or less than three such flows.

The unit 12 shown in FIG. 2 is in the form of a fuel crusher 16 upstream of a cyclone 15. The fuel enters from above into the cyclone 15, whereas the hot gas 13 is blown in from the side tangentially (as shown). The fuel is entrained in the gas 13 and is distributed by means of the cyclone 15 around the periphery of the latter in a helical fashion and can be extracted at the three different outlets 27, 28 and 29 at different axial heights. The outlets can be at different radial positions along the periphery, and the plurality of sub-flows can be taken out at different axial and/or peripheral parts of the circumference, for example at 17, 18 and/or 19 as shown in FIG. 2. The fly ash introduced through the duct 14 becomes entrained with the coal and becomes adhered to the moist surfaces of the coal particles to act as a drying agent.

The distribution of the crushed/dried coal between the separate flows required for the solid fuel boiler can be effected in the apparatus shown in FIG. 3 or FIG. 4.

The arrangement shown in FIG. 3, comprises a vessel 12a containing a hollow rotor arm 20 to the interior of which the moist particulate coal 11a is supplied. The gas 13 can be fed with the coal through the arm 20 or it can be supplied separately to entrain the coal as it leaves the end of the arm 20. The mixture moves in a circular fashion within the vessel 12a and through different outlets 21,22, etc. The grinding has to be carried out in a separate crusher.

In the FIG. 3 embodiment, injection of hot air and feeding-in of fly ash can be performed. Instead of an arm 20, a vane or the like can be arranged in the bottom of the vessel 12a. The arm 20 can also be arranged at the bottom of the vessel 12a.

FIG. 4 shows a fluidized bed 23 for the distribution of fuel, which bed is not to be confused with the fluidized beds 2 and 6 in the boiler 1. The fluidized bed 23 is provided with outlet tubes 24 leading from a weir or spillway. When the level in the fluidized fuel bed 23 is at the same level as the weirs, the bed material leaves the bed 23 distributed among the different outlet tubes 24. The fluidizing gas fed to the bed 23 can either be the drying gas mentioned above, or cold gas transporting fly ash into the bed 23. The fluidizing gas is fed in at 25 and the fuel at 26. Locating the feeding point 26 below the bed surface in a fluidized bed gives a better and more uniform distribution of fuel between the various outlet tubes 24.

The method as described above with reference to the drawing can be varied in many ways within the scope of the appended claims.

We claim:

1. A method of treating moist solid fuel to prepare it for use in a solid fuel boiler, said method comprising the steps of (1) crushing the moist solid fuel, (2) mixing the crushed, moist solid fuel of step (1) with a drying gas so as to form a fuel-gas mixture, said drying gas causing the crushed, moist solid fuel to become at least partially dried, (3) moving the fuel-gas mixture of step (2) in a helical fashion within a cyclone, and (4) removing a plurality of subflows of said fuel-gas mixture from said cyclone, said subflows of said fuel-gas mixture being suitable for separate introduction into a solid fuel boiler.

2. A method according to claim 1, wherein in step (4) said subflows of said fuel-gas mixture are removed from the periphery of said cyclone.

3. A method of treating moist solid fuel to prepare it for use in a solid fuel boiler, said method comprising the steps of (1) crushing the moist solid fuel, (2) mixing the crushed, moist solid fuel of step (1) with (a) fly ash so that the fly ash will stick to the crushed, moist solid fuel and cause it to become at least partially dehydrated, and (b) a gas so as to form a fuel-gas mixture, (3) moving said fuel-gas mixture of step (2) in a helical fashion within a cyclone, and (4) removing a plurality of subflows of said fuel-gas mixture from said cyclone, said subflows of fuel-gas mixture being suitable for separate introduction into a solid fuel boiler.

4. A method according to claim 3, wherein in step (4) said subflows of said fuel-gas mixture are removed from the periphery of said cyclone.

5. A method of treating moist solid fuel to prepare it for use in a solid fuel boiler, said method comprising the steps of (1) crushing the moist solid fuel, (2) mixing the crushed, moist solid fuel of step (1) with a drying gas so as to form a fuel-gas mixture, said drying gas causing the crushed, moist solid fuel to become at least partially dried, (3) moving the fuel-gas mixture of step (2) in a circular fashion within a vessel, and (4) removing a plurality of subflows of said fuel-gas mixture from said vessel, said subflows of fuel-gas mixture being suitable for separate introduction into a solid fuel boiler.

6. A method of treating moist solid fuel to prepare it for use in a solid fuel boiler, said method comprising the steps of (1) crushing the moist solid fuel, (2) mixing the crushed, moist solid fuel of step (1) with (a) fly ash so that the fly ash will stick to the crushed, moist solid fuel and cause it to become at least partially dehydrated, and (b) a gas so as to form a fuel-gas mixture, (3) moving the fuel-gas mixture of step (2) in a circular fashion within a vessel by discharge from a hollow arm rotating within the vessel, and (4) removing a plurality of subflows of said fuel-gas mixture from said vessel, said subflows of fuel-gas mixture being suitable for separate introduction into a solid fuel boiler.

7. A method of of treating moist solid fuel to prepare it for use in a solid fuel boiler, said method comprising the steps of (1) crushing the moist solid fuel, (2) mixing the crushed, moist solid fuel with a drying agent to form a fuel-drying agent mixture, said drying agent at least partially drying said crushed, moist solid fuel, (3) setting said fuel-drying agent mixture in motion in a fluidized bed distributor, and (4) removing a plurality of subflows of said fuel-drying agent mixture from said fluidized bed distributor via lateral spillways, said subflows of fuel-drying agent mixture being suitable for separate introduction into a solid fuel boiler.

8. A method according to claim 7, wherein said drying agent is a hot gas supplied to said fluidized bed distributor.

* * * * *